US008328618B2

(12) United States Patent
Ekisheva et al.

(10) Patent No.: US 8,328,618 B2
(45) Date of Patent: Dec. 11, 2012

(54) METHOD AND SYSTEM FOR CONDUCTING A LOTTERY GAME AS A FUNCTION OF A PLAYER'S PURCHASE AT A RETAIL ESTABLISHMENT

(75) Inventors: Svetlana Ekisheva, Atlanta, GA (US); Amy Hill, Cumming, GA (US); Charles Boykin, Alpharetta, GA (US)

(73) Assignee: Scientific Games International Inc., Newark, DE (US)

( * ) Notice: Subject to any disclaimer, the term of this patent is extended or adjusted under 35 U.S.C. 154(b) by 556 days.

(21) Appl. No.: 12/365,952

(22) Filed: Feb. 5, 2009

(65) Prior Publication Data

US 2009/0221343 A1 Sep. 3, 2009

Related U.S. Application Data

(60) Provisional application No. 61/027,583, filed on Feb. 11, 2008.

(51) Int. Cl.
*A63F 9/24* (2006.01)
*A63F 13/00* (2006.01)
*G06F 17/00* (2006.01)
*G06F 19/00* (2011.01)

(52) U.S. Cl. ................................. 463/18; 463/17
(58) Field of Classification Search ................ 463/16, 463/17, 18, 19, 20, 21, 22; 273/269
See application file for complete search history.

(56) References Cited

U.S. PATENT DOCUMENTS

| 4,993,714 | A | 2/1991 | Golightly |
| 5,256,863 | A | 10/1993 | Ferguson et al. |
| 6,119,009 | A | 9/2000 | Baranger et al. |
| 6,119,099 | A | 9/2000 | Walker et al. |
| 6,887,153 | B2 * | 5/2005 | Walker et al. ............... 463/17 |
| 7,841,932 | B2 * | 11/2010 | Sadri et al. ................. 463/16 |
| 2004/0039645 | A1 | 2/2004 | Walker et al. |
| 2004/0193464 | A1 | 9/2004 | Szrek et al. |
| 2005/0059463 | A1 | 3/2005 | Gilmore et al. |
| 2006/0246992 | A1 | 11/2006 | Walker et al. |
| 2008/0132314 | A1 * | 6/2008 | Robb et al. ................. 463/17 |
| 2011/0300927 | A1 * | 12/2011 | Baerlocher .................. 463/26 |

OTHER PUBLICATIONS

PCT Search Report, May 26, 2009.

* cited by examiner

*Primary Examiner* — Jarrett Stark
(74) *Attorney, Agent, or Firm* — Dority & Manning, P.A.

(57) ABSTRACT

A system and method for conducting a lottery game at a retail establishment wherein players purchase goods or services involve a player placing a wager that is a function of the purchase price of the goods or services purchased at the retail establishment. A lottery draw is conducted at the time of purchase of the goods or services, or at a later time, wherein the probability of winning the draw is a function of the amount of the wager. For a winning draw, the player is awarded a prize that is a function of the purchase price of the goods or services.

20 Claims, 3 Drawing Sheets

METHOD AND SYSTEM FOR CONDUCTING A LOTTERY GAME AS A FUNCTION OF A PLAYER'S PURCHASE AT A RETAIL ESTABLISHMENT

PRIORITY CLAIM

The present application claims priority to U.S. Provisional Application Ser. No. 61/027,583, filed Feb. 11, 2008.

BACKGROUND

Lottery tickets are sold at many types of retail establishments including, stores, such as grocery stores, general merchandise stores, and the like. These games are typically online terminal based games wherein players purchase a lottery ticket with either their selection of objects or characters from a defined set (i.e., numbers from a set of number ranging from 1 to 99), or a set of such objects or characters are randomly generated for the player. The lottery gaming authority conducts a subsequent drawing from the set of characters or objects, and players win based on the number or combination of matches in their selection with the draw set. Examples of such games include "Pick-3", "Pick-4", "Lotto", "Powerball", and so forth. These games are well known to those skilled in the art.

Instant scratch-off lottery tickets are also quite popular and are offered at a wide variety of retail establishments. These tickets generally relate to a game theme, such as bingo or poker, and the player determines if the ticket is a winner by removing an opaque scratch-off material from the play area to reveal certain game variables.

It is generally recognized in the industry that new and different games are essential to sustaining the public's interest and participation in lottery games. Game themes tend to grow stale over time, and must be replaced with newer, more exciting games. With the above-described types of games, this burden falls solely on the gaming authority. New game themes, rules, payouts, etc. are strictly a function of the games supplied by the lottery authority to the retail establishments. Player participation and interest is dictated solely by the boundaries of the game supplied to the retail establishment, with the retail establishments often acting as little more than vendors of the lottery tickets. If the game has no appeal to the player, there is little that can be done at the retail establishment to generate more interest in the game. Also, as more and more establishments offer lottery games, the marketing value of the games for such establishments diminishes.

The lottery games offered at retail establishments also have the disadvantage that the establishment typically has one or more check-out points, commonly referred to as check-out lanes, with each check-out lane equipped with a point-of-sale (POS) terminal. In contrast, lottery tickets are typically sold at a separate lottery point-of-sale terminal or terminals within the same retail establishment. This system generally requires additional personnel to staff the lottery POS terminal, or requires the store clerk to divide their time and responsibility between the lottery POS terminal and the store POS terminal. For larger stores having many POS terminals, customers wishing to also purchase lottery tickets may be faced with a bottleneck situation when there are significantly fewer lottery POS terminals.

The present invention is useful in that it provides a method and system for conducting a lottery game at retail establishments that is a function of events that transpire at the retail establishment, with each play of the game being different based on the player's interaction with the retail establishment prior to the game. The games may be played directly at the establishment POS terminals.

SUMMARY

Objects and advantages of the invention will be set forth in part in the following description, or may be obvious from the description, or may be learned through practice of the invention.

In one embodiment, the present invention provides a method for conducting a lottery game at a retail establishment wherein players purchase goods or services. The game is not limited to any particular type of retail establishment, and may be implemented at establishments currently offering lottery games, such as convenience stores, supermarkets, and the like. The game may also be implemented at other non-conventional types of retail establishments, such as restaurants, hardware stores, appliance stores, department stores, large retail stores, and virtually any establishment where goods or services are offered. The lottery game can be offered to customers of the retail establishment at any combination of the establishment's checkout POS terminals, and preferably at each such terminal.

The game method involves a player placing a wager that is a function of the purchase price of the goods or services purchased by the player. This wager may simply be added as a line item to the player's order or receipt and paid directly to the retail establishment, which would periodically account to the lottery gaming authority for the wagers (and prize payouts). After the wager is computed and placed, a lottery draw is conducted. This lottery draw may be played immediately at the time of purchase of the goods or services, or at a subsequent time. The probability of the player winning the lottery draw is a direct function of the purchase price of the goods or services (which dictates the wager amount), and the prize award is a direct function of the purchase price of the goods or services. Desirably, the player is immediately notified of the results of the lottery draw at the time of purchase of the goods or services.

In a particular embodiment, the wager amount corresponds to the amount needed to round the purchase price to a defined incremental value. This value may be, for example, the next highest whole dollar amount. For example, if the purchase price is $10.25, then the wager amount is $0.75. If the purchase price is $10.00, then the wager amount is $1.00.

It should be appreciated that the purchase price may be rounded up to the next highest multiple of $10, $20, $50, $100, or even higher, depending on the nature and value of the goods being purchased. The incremental roundup number may be a function of the total purchase price. For example, the roundup requirement may be to the next highest $1.00 for purchases between $1.00 and $1,000.00, and to the next highest $10.00 multiple for purchases between $1,001.00 and $10,000.00, and to the next highest $100.00 multiple for purchases greater than $10,001.00, and so forth. With the higher purchase values and corresponding larger wager amounts, the probabilities can still be maintained in conformity with the overall lottery system payout.

The prize award for a winning draw in a particular embodiment of the game method corresponds to the rounded up purchase price of the goods or services. For example, for the purchase prices of $10.00 and $10.25 discussed above, the prize payout amount would be $11.00, and the probability of winning this award is proportional to the wager amount. In other words, the player having the purchase price of $10.00 wagers more than the player with the purchase price of $10.25, and thus has a better probability of winning.

The lottery authority establishes winning probabilities based on a desired payout percentage. For example, the lottery authority may desire an award payout of 55% for the lottery game (i.e., 55% of the amount taken in is paid out in prizes). With this defined payout, the winning probabilities are computed, with the probabilities being proportional to the wager amount for a given rounded up purchase price, and inversely proportional to the rounded up purchase price at a given wager amount.

The lottery draw itself can take on various formats. In a particular embodiment, the draw may correspond to a "Pick-3" or "Lotto" game format wherein the player is assigned one or more objects (e.g., numbers, characters, symbols, and the like) from a defined set, with the range of the defined set and number of objects computed in accordance with the game probabilities. The lottery system then randomly generates a set of play objects from the defined set. The player wins the lottery draw if their assigned object(s) matches some stipulated number or configuration of the play objects(s). The player's assigned objects may be randomly generated for the player, or selected by the player. It should be readily appreciated that any manner of random selection game may be implemented as the lottery draw component of the game method.

The present invention also encompasses a system configuration for implementing the game described herein at one or more checkout POS terminals in a retail establishment. The system may include a lottery terminal system configured in communication with the POS checkout terminal for transmission of the player's purchase price. The lottery terminal system is configured to conduct the lottery game at the POS checkout terminal whereby the player places a wager that may be added to their purchase price and paid directly to the retail establishment in the event that the player loses the lottery game. The wager amount is a function of the purchase price of the goods or services, as discussed above.

The lottery terminal system is configured to conduct a lottery draw at the time of purchase of the goods or services wherein the probability of winning the draw is a function of the amount of the wager and the purchase price, in particular the rounded up purchase price. For each lottery draw, the terminal system provides an indication to the player of the outcome of the game, for example by a lottery ticket printed at the POS terminal.

Desirably, the retail establishment includes multiple POS checkout terminals, and at least one lottery terminal system is configured at each POS checkout terminal so that any customer of the establishment is given the opportunity to play the lottery game regardless of where they check out.

The lottery terminal systems may be networked with a central game computer system having a hardware and software configuration to implement the lottery game at multiple retail establishments. The central computer can carry out any number of control functions, including monitoring, establishing game parameters, accounting for game proceeds, and the like. In addition, the lottery terminal systems and/or central game computer may be interfaced with a central computer for the retail establishment for any number of functions, including accounting to lottery authority for wagers and prize awards, and so forth.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
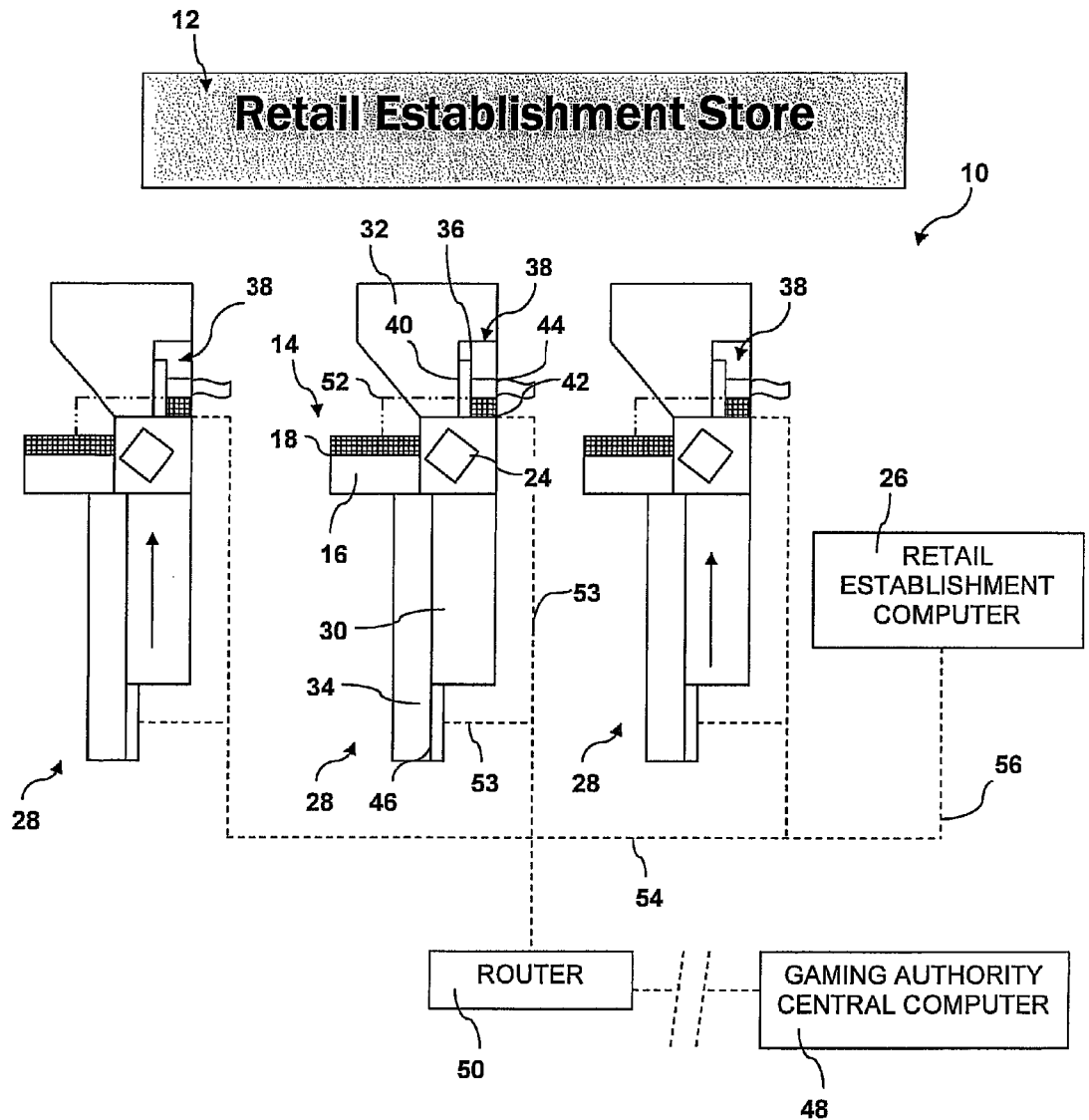
FIG. 1 is a diagram illustrating an exemplary system configuration at a retail establishment for implement the game according to the invention.

FIG. 1 is a diagrammatic view of a system configuration within a retail establishment for implementing the lottery game in accordance with aspects of the invention. Referring to FIG. 1, a retail establishment 12 is depicted with multiple checkout lanes 28 where customers purchase products or goods. As mentioned, it should be readily appreciated that the retail establishment 12 may be any manner of establishment wherein customers purchase goods or services. For example, the retail establishment 12 may be a restaurant, or any other establishment offering services (as compared to goods), a department store, retail store, and so forth. The depiction of the retail establishment 12 in FIG. 1 is for illustrative purposes only.

Each of the checkout lanes 28 includes conventional system components, such as a point of sale (POS) terminal 14, display 16, keypad 18, a card reader 20, a printer 22, and an item scanner 24. Each of the checkout lanes 28 may include a conventional product conveyor 30 that conveys products to the point of sale terminal 14 wherein the products are passed over the scanner 24, which may be a conventional bar code scanner which uses reflected laser light to recognize machine-readable bar codes, such as UPC codes, on the purchased items. Each of the checkout lanes 28 may also incorporate a merchandising area 34 that may include, for example, one or more racks, shelves, or other displays whereby items are offered to customers in line at the checkout lane 28. For example, in a conventional grocery store configuration, the merchandising areas 34 may be used to promote candy, magazines, novelties, and other impulse items. Each of the checkout lanes 28 may include any manner of bagging area 32 wherein the purchase products are subsequently bagged for the customer. Each lane 28 may further include a check-writing stand 36, which is typically a flat area that can be used by customers as a writing surface. A credit card reader 20 (FIG. 2) may be configured with the check writing stamp 36.

It should be appreciated that the component configuration at the individual checkout lanes 28 is not a limiting factor of the present system or methodology, and that those skilled in the art may configure a system with any manner of conventional POS components for implementing the game methodology according to the invention.

Figure 2:
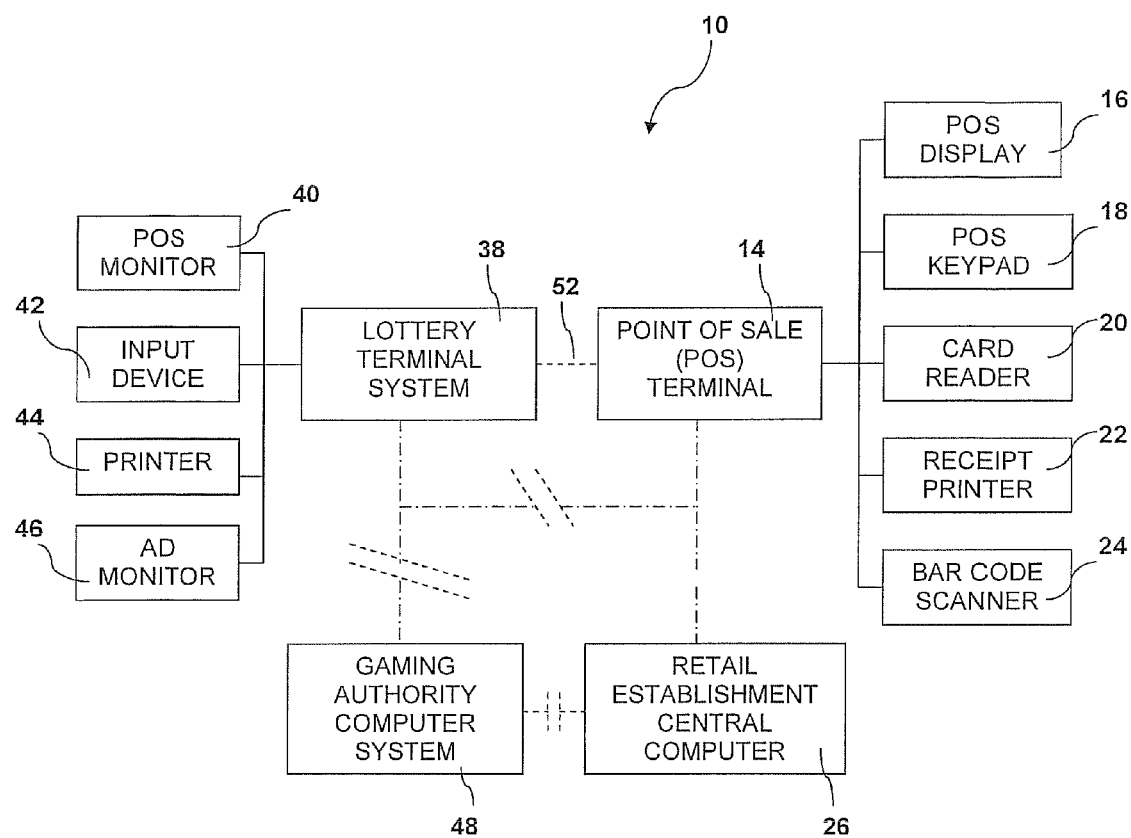
FIG. 2 is a block diagram illustrating components at an exemplary check-out lane of the retail establishment.

Referring to FIGS. 1 and 2, at least one of the checkout lanes 28 incorporates a lottery terminal system 38. Desirably, the lottery terminal system 38 is configured in close proximity to the POS terminal 14. The lottery terminal system 38 is electronically interfaced with the POS terminal 14, as depicted by the line 52 in FIG. 1. The lottery terminal system 38 may include any configuration of components, such as a display 40, an input device 42 such as a keypad, play slip scanner, or the like, and a lottery ticket printer 44. These components may be configured at any convenient location at the POS terminal 14, or any other location in the retail establishment 12. In the embodiment illustrated in FIG. 1, the components are configured at the check-writing stand 36 so as to be readily visible and accessible to a player.

Each of the checkout lanes 28 may include a marketing monitor or display 46 at the entrance to the checkout lane to promote the lottery game and to provide customers with instructions on how to play the game. For example, the display or monitor 46 may play a video that informs potential players of the game prior to the player's proceeding to purchase their goods or services from the retail establishment.

The various lottery terminal systems 38 and associated components may be connected to the POS terminals 14 and to each other in any suitable manner. The connections can include, for example, USB, RS-232, IEEE 1394, or another serial, parallel, or other data connections. The connection to the POS terminal 14 is indicated by line 52 in FIG. 1, and the inter-connections between the system 38 components is illustrated by line 53 in FIG. 1.

Referring to FIGS. 1 and 2, each of the lottery terminal systems 38 may be interfaced with a gaming authority central computer system 48 via a bus 54 and a router 50. Thus, in this particular embodiment, the connection comprises a wireless connection implemented by the router 204. It should be appreciated that any manner of conventional networking configuration may be utilized to place the systems 38 in communication with the central gaming authority 48, or with each other. For example, in certain embodiments, the lottery terminal systems 38 may include built-in wireless routers so as to communicate directly with the gaming authority computer 48.

The retail establishment 12 typically includes a central computer 26, with the various POS terminals 14 being interfaced with this computer by, for example, a local area network or other conventional connection. The retail establishment computer 26 may serve any number of conventional functions, such as tracking sales, inventory, and any other data and activity related to the purchase of goods at the individual POS terminals 14. The computer 26 may be connected to other systems, such as an enterprise-level accounting, inventory, and sales system via additional connections, such as a LAN/WAN connection.

The lottery terminal systems 38 are also in communication with the retail establishment computer 26 by any conventional communication means. In the embodiment illustrated in FIG. 1, the bus 54 is in communication with the computer 26 via line 56. This connection may be, for example, a wireless connection. In an alternative embodiment, each of the lottery terminal systems 38 may be in direct communication with the retail establishment computer 26 by way of, for example, built-in router systems.

It may also be desirable for the lottery gaming authority central computer 48 to communicate with the retail establishment central computer 26. This communication may be implemented by any suitable means, and the various connection lines illustrated in FIGS. 1 and 2 are for illustrative purposes only.

The respective lottery terminal systems 38 may comprise a general purpose or specialized computer system that runs one or more programs to facilitate play of the lottery game described herein. This computer system 38 is interfaced with the POS terminal 14 to receive transmission of the player's purchase price. Upon receipt of this information, the lottery terminal computer system implements the software and hardware necessary to prompt the player and conduct the lottery game described herein. Each of the lottery terminal systems 38 may be configured to individually conduct a lottery game, with periodic downloads and updates from the gaming authority central computer 48. In alternative embodiments, each lottery game is conducted by the gaming authority central computer 48 via the individual lottery terminal systems 38.

It should be readily appreciated that the various system component configurations illustrated and discussed herein are not limiting features of the invention. Suitable implementing systems are not limited to any particular hardware, architecture, or configuration. System embodiments for conducting the lottery game at any manner of retail establishment may be implemented by one or more general purpose or customized computing systems adapted in any suitable manner to provide the desired functionality for conducting the lottery game. For example, one or more computing devices may be adapted to provide desired functionality by accessing software instructions rendered in a computer-readable form. When software is used, any suitable programming, scripting, or other type of language or combinations of languages may be used to implement the gaming methodology. In certain embodiments, software may be limited and the desired functionality can be implemented by hard-wired logic or other circuitry, including application-specific circuits. Combinations of computer-executed software and hard-wired logic or other circuitry may be suitable, as well.

The transmission and relay of data between POS terminals, lottery terminal systems, retail establishment central computers, and gaming authority computer systems can take place over one or more communications networks of various forms. For example, a suitable network can comprise a dial-in network, a local area network (LAN), wide area network (WAN), public switched telephone network (PSTN), the internet, intranet, or other type of network. A network may comprise any number and/or combination of hard-wired, wireless, or other communication links.

An exemplary embodiment of the lottery game that may be played by customers of a retail establishment is discussed below with reference to the flow chart in FIG. 3. As explained above, the game methodology involves a player placing a wager that is a function of the purchase price of the goods or services purchased from the retail establishment. At step A in FIG. 3, the purchase price of the goods or services is computed and the customer is queried at the POS terminal as to whether or not they desire to participate in the lottery game. If the customer declines to play at step B, then the transaction is terminated at step C and the customer pays the purchase price for their respective goods or services.

If the customer desires to play at step D, then the lottery terminal system components receive transmission of the purchase price and round the purchase price up to a defined incremental value. The wager amount is then computed as the difference between the purchase price and the roundup value. The roundup value may be, for example, the next highest whole dollar amount. For example, if the purchase price is $10.25, then the roundup purchase price is $11.00 and the wager amount is $0.75. If the purchase price is $10.00, then the roundup purchase price is $11.00 the wager amount is $1.00. As mentioned above, it should be appreciated that the purchase price may be rounded up to the next highest multiple of $10.00, $20.00, $50.00, $100.00, and so forth, depending on the nature and value of the goods purchased. The incremental roundup number may be established by the lottery gaming authority as a function of the total purchase price. For example, the roundup requirement may be to the next highest $1.00 for purchases between a certain range, for example between $1.00 and $1,000.00. The roundup number may be to the next highest $10.00 multiple for purchases between $1,001.00 and $10,000.00, and so forth. With higher purchase values, a correspondingly higher wager amount is desired so that the probabilities for a winning lottery draw can be maintained by the gaming authority in conformity with the desired overall lottery system payout.

Figure 3:
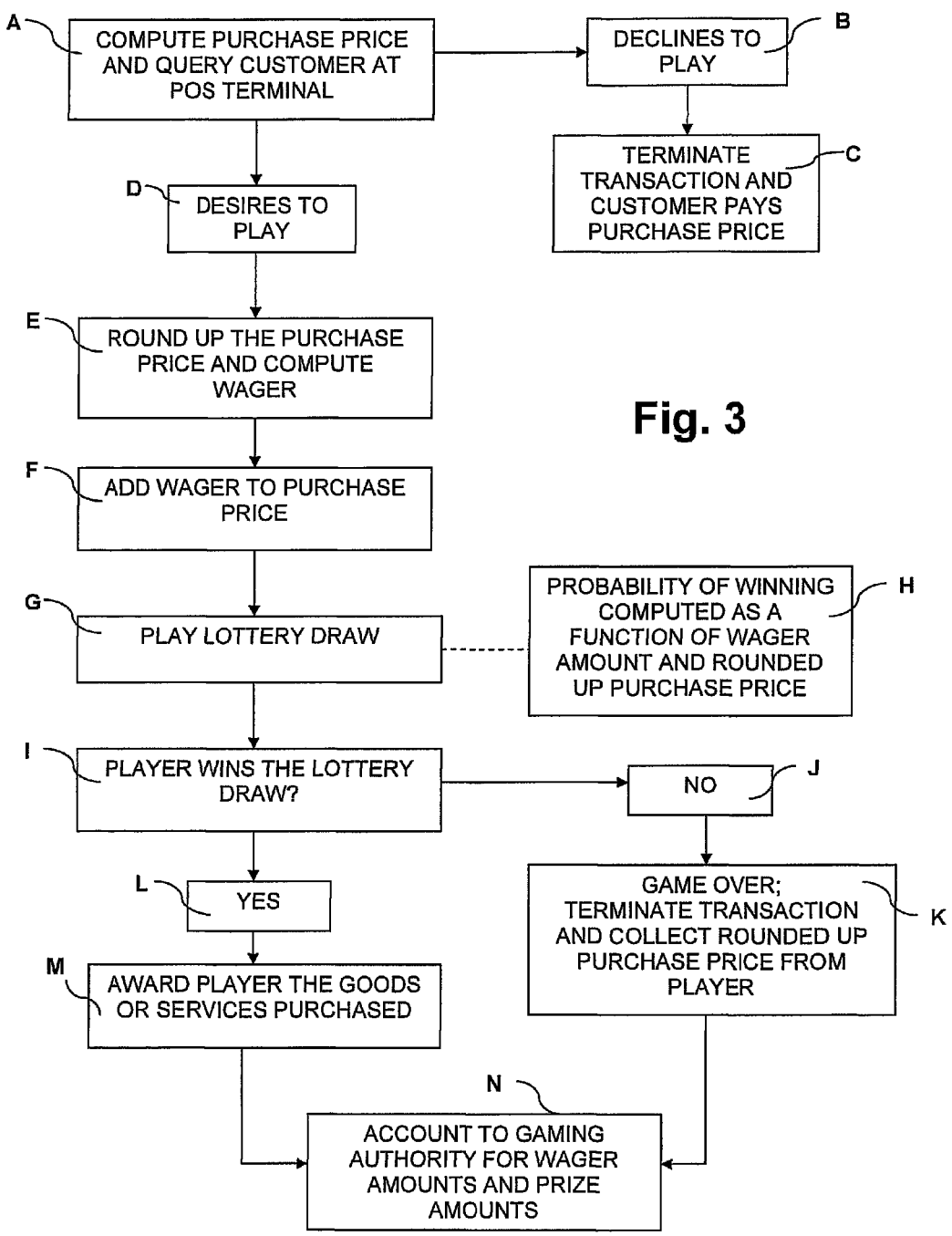
FIG. 3 is a flowchart diagram illustrating aspects of an exemplary game methodology according to the invention.

At step F in FIG. 3, the wager amount for playing the lottery game is added to the player's purchase price.

At step G, the lottery draw is conducted at the time of the purchase, or at a later time. The probability of the player winning at this lottery draw is computed as a function of the wager amount and the rounded up purchase price, as indicated at step H in FIG. 3. The prize award for the winding draw in any particular embodiment of the game corresponds to the rounded up purchase price of the goods or services. For example, for the purchase prices of $10.00 and $10.25 discussed above, the prize award would be $11.00. The probability of winning this award is proportional to the wager amount. For example, the player having the purchase price of $10.00 wagers more than the player with the purchase price of $10.25, and thus has a better probability of winning.

The lottery authority establishes winning probabilities based on a desired payout percentage. In the tables below, probabilities are given for various purchase values for payout percentages of 55%, 60%, and 65%, respectively. Based on a desired payout percentage, the winning probabilities are computed as a function of the wager amount for a given purchase price. For example, referring to the first sub-table under Table A, for a 55% payout schedule, the wager amount for a purchase value of $20.01 is $0.99, and the probability of winning the lottery draw is 1 in 38.6. For a purchase value of $20.50, the wager amount is $0.50 and the probability of winning the lottery draw is 1 in 76.4. For a purchase price of $20.99, the wager amount is $0.01 and the probability of winning the lottery draw is 1 in 3,812.2. The prize award for all of these scenarios is the rounded up purchase price of $21.00. It can thus be seen from this table that, as the wager amount increases, the probability of winning the lottery draw also increases. Thus, for a given rounded up purchase price, the probability of winning the lottery draw is proportional to the wager amount.

The second sub-table under Table A illustrates purchase prices that would have a rounded up value of $41.00. The wager amounts correspond to the wager amounts in the first sub-table, but the probabilities of winning the lottery draw for any given wager amount is less than the respective probabilities in the first table. For instance, the wager amount for the purchase price of $40.01 in the second sub-table is $0.99 and the probability of success is 1 in 75.3, as compared to the probability of success of 1 in 38.6 in the first sub-table. This relationship is reflected in all of the sub-tables within Tables A through C. Thus, the probability of success in the lottery draw at a given wager amount is inversely proportional to the rounded up purchase price (or prize award amount).

Tables B and C illustrate the same scenarios as Table A, but at a different payout schedule. As reflected in the various sub-tables, as the lottery payout schedule increases, the probability of success in the lottery draw increases proportionately.

TABLE A

Sample Probability Tables for a 55% payout

| Purchase Value | $20.01 | $20.25 | $20.50 | $20.75 | $20.99 | $21.00 |
|---|---|---|---|---|---|---|
| Game cost | $0.99 | $0.75 | $0.50 | $0.25 | $0.01 | $1.00 |
| 1/Probability | 38.6 | 50.9 | 76.4 | 152.7 | 3,818.2 | 40.0 |
| Purchase Value | $40.01 | $40.25 | $40.50 | $40.75 | $40.99 | $41.00 |
| Game cost | $0.99 | $0.75 | $0.50 | $0.25 | $0.01 | $1.00 |
| 1/Probability | 75.3 | 99.4 | 149.1 | 298.2 | 7,454.5 | 76.4 |
| Purchase Value | $70.01 | $70.25 | $70.50 | $70.75 | $70.99 | $71.00 |
| Game cost | $0.99 | $0.75 | $0.50 | $0.25 | $0.01 | $1.00 |
| 1/Probability | 130.4 | 172.1 | 258.2 | 516.4 | 12,909.1 | 130.9 |
| Purchase Value | $100.01 | $100.25 | $100.50 | $100.75 | $100.99 | $101.00 |
| Game cost | $0.99 | $0.75 | $0.50 | $0.25 | $0.01 | $1.00 |
| 1/Probability | 185.5 | 244.8 | 367.3 | 734.5 | 18,363.6 | 185.5 |

TABLE B

Sample Probability Tables for a 60% payout

| Purchase Value | $20.01 | $20.25 | $20.50 | $20.75 | $20.99 | $21.00 |
|---|---|---|---|---|---|---|
| Game cost | $0.99 | $0.75 | $0.50 | $0.25 | $0.01 | $1.00 |
| 1/Probability | 35.4 | 46.7 | 70.0 | 140.0 | 3,500.0 | 36.7 |
| Purchase Value | $40.01 | $40.25 | $40.50 | $40.75 | $40.99 | $41.00 |
| Game cost | $0.99 | $0.75 | $0.50 | $0.25 | $0.01 | $1.00 |
| 1/Probability | 69.0 | 91.1 | 136.7 | 273.3 | 6,833.3 | 70.0 |
| Purchase Value | $70.01 | $70.25 | $70.50 | $70.75 | $70.99 | $71.00 |
| Game cost | $0.99 | $0.75 | $0.50 | $0.25 | $0.01 | $1.00 |
| 1/Probability | 119.5 | 157.8 | 236.7 | 473.3 | 11,833.3 | 120.0 |
| Purchase Value | $100.01 | $100.25 | $100.50 | $100.75 | $100.99 | $101.00 |
| Game cost | $0.99 | $0.75 | $0.50 | $0.25 | $0.01 | $1.00 |
| 1/Probability | 170.0 | 224.4 | 336.7 | 673.3 | 16,833.3 | 170.0 |

TABLE C

Sample Probability Tables for a 65% payout

| Purchase Value | $20.01 | $20.25 | $20.50 | $20.75 | $20.99 | $21.00 |
|---|---|---|---|---|---|---|
| Game cost | $0.99 | $0.75 | $0.50 | $0.25 | $0.01 | $1.00 |
| 1/Probability | 32.6 | 43.1 | 64.6 | 129.2 | 3,230.8 | 33.8 |
| Purchase Value | $40.01 | $40.25 | $40.50 | $40.75 | $40.99 | $41.00 |
| Game cost | $0.99 | $0.75 | $0.50 | $0.25 | $0.01 | $1.00 |
| 1/Probability | 63.7 | 84.1 | 126.2 | 252.3 | 6,307.7 | 64.6 |
| Purchase Value | $70.01 | $70.25 | $70.50 | $70.75 | $70.99 | $71.00 |
| Game cost | $0.99 | $0.75 | $0.50 | $0.25 | $0.01 | $1.00 |
| 1/Probability | 110.3 | 145.6 | 218.5 | 436.9 | 10,923.1 | 110.8 |
| Purchase Value | $100.01 | $100.25 | $100.50 | $100.75 | $100.99 | $101.00 |
| Game cost | $0.99 | $0.75 | $0.50 | $0.25 | $0.01 | $1.00 |
| 1/Probability | 157.0 | 207.2 | 310.8 | 621.5 | 15,538.5 | 156.9 |

It should be readily appreciated that the above tables are for illustrative purposes only. It is well within the level of those skilled in the art of lottery game statistics and probabilities to devise a game schedule with prize awards and probabilities that are attractive to potential players, yet are in accordance with a payout schedule that satisfies the lottery game requirements.

The lottery draw game may take on various forms. In a particular embodiment, the lottery draw may correspond to a conventional game, such as "Pick-3" or "Lotto" games wherein the player selects or is randomly assigned one more objects (e.g. numbers) from a defined set. The range of the defined set and number of objects in the play are computed in accordance with the game probabilities. The lottery system then randomly generates a set of the play objects from the defined set, and the player wins the lottery draw if their selected or assigned objects match the randomly generated play objects. The player may select their objects via a keypad, touch screen, or other input mechanism at the lottery terminal apparatus, or the objects may be randomly assigned to the player by the lottery terminal system.

At step I in FIG. 3, the player is notified as to whether they have won the lottery draw. This may be done, for example, by issuing a lottery ticket to the player at the POS terminal, with the ticket indicating the player's assigned or selected objects, as well as the randomly generated objects. The ticket may also indicate whether the player is a winner or not. If it is determined that the player has not won the lottery draw in step J, then the game is terminated in step K and the player's purchase transaction is completed. The purchaser pays the rounded up purchase price for their goods or services, which includes the wager amount.

If it is determined that the player won the lottery draw in step M, then the player is awarded their goods or services as the prize award.

At an appropriate time, the retail establishment accounts to the gaming authority in step N for the wager amounts and prize amounts. For example, the retail establishment tenders to the lottery game authority the value (or defined percentage) of the wagers placed at the various POS terminals within the establishment, and collects reimbursement for prize awards made to winning players.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for conducting lottery games at a retail establishment using non-transitory computer-readable media wherein players purchase goods or services, comprising:
   a player placing a wager that is a function of the purchase price of the goods or services purchased at the retail establishment, the wager automatically determined and presented to the player as the amount needed to round the purchase price to a defined value;
   conducting a lottery draw wherein the probability of winning the draw is a function of the amount of the wager such that for the same given prize amount in different lottery draws, wherein each lottery draw comprises a separate game, the probability of winning varies proportionally to the wager amount in a particular lottery draw;
   for a winning draw, awarding the player a prize that is a function of the purchase price of the goods or services such that the prize amount in any one of the separate lottery draws is a function of the rounded up purchase price; and
   for the same wager amount in different, separate lottery draws, the probability of winning also varies between different prize amounts such that the probability of winning in a particular lottery draw decreases as the prize amount increases.

2. The method as in claim 1, wherein the lottery game is offered to customers of the retail establishment at the establishment's check-out point-of-sale (POS) terminal.

3. The method as in claim 2, wherein the lottery game is offered at multiple check-out POS terminals at the retail establishment.

4. The method as in claim 1, wherein the lottery draw is conducted and the time of purchase of the goods or services and the player is immediately notified of the results of the lottery draw at the time of purchase of the goods or services.

5. The method as in claim 1, wherein the defined value of the player's wager amount increases as a function of increasing purchase price.

6. The method as in claim 5, wherein different increasing defined values are assigned to increasing ranges of purchase prices.

7. The method as in claim 1, wherein the prize award for a winning draw is the rounded up purchase price of the goods or services.

8. The method as in claim 1, wherein the lottery draw comprises assigning the player one or more objects from a defined set of the objects, and then randomly generating a defined set of the objects, the player winning the lottery draw if their assigned objects matches a stipulated number or pattern of the randomly generated objects.

9. The method as in claim 8, wherein the player's assigned objects are randomly generated for the player.

10. The method as in claim 8, wherein the player's assigned objects are selected by the player.

11. A system for conducting lottery games at a retail establishment, said system comprising:
    a retail establishment point-of-sale (POS) checkout terminal configured for computing the purchase price of goods or services purchased by a player;
    a lottery terminal system configured in communication with said POS checkout terminal for receipt of the purchase price, said terminal system having a hardware and software configuration to conduct a lottery game at said POS checkout terminal whereby a player places a wager that is automatically computed by said lottery terminal system as the amount needed to round up the purchase price of the goods or services to a defined value;
    said lottery terminal system configured to conduct lottery draws wherein each lottery draw comprises a separate game and wherein the probability of winning in any one draw is a function of the amount of the wager such that for the same given prize amount in the separate, different lottery draws, the probability of winning varies proportionally to the wager amount in a particular lottery draw, and for a winning draw, indicating to the player a prize payout amount that is dependent upon the rounded up purchase price; and
    said lottery terminal system further configured to establish the probability of winning in the separate lottery draws such that for the same wager amount in different lottery draws, the probability of winning varies between different prize amounts and decreases as the prize amount increases.

12. The system as in claim 11, comprising multiple POS checkout terminals at the retail establishment, and at least one said lottery terminal system configured at each said POS checkout terminal.

13. The system as in claim 12, further comprising a central game computer system having a hardware and software configuration to implement the lottery game at multiple retail establishments, said lottery terminal systems networked with said central game computer.

14. The system as in claim 13, wherein said central game computer establishes a probability of winning for each game played at said lottery terminal systems.

15. The system as in claim 11, wherein the defined value of the player's wager amount increases as a function of increasing purchase price.

16. The system as in claim 15, wherein the wager amount is the amount needed to round the purchase price up to the next highest whole dollar.

17. The system as in claim 16, wherein different increasing defined values are assigned to increasing ranges of purchase prices.

18. The system as in claim 11, wherein said lottery terminal apparatus is configured to conduct the lottery draw by assigning to the player one or more objects from a defined set of the objects, and then randomly generating a defined set of the objects, the player winning the lottery draw if their assigned objects match a stipulated number or pattern of the randomly generated objects.

19. The system as in claim 18, wherein said lottery terminal system randomly generates the player's assigned objects.

20. The system as in claim 18, wherein said lottery terminal system is configured to accept a player's selection of the assigned objects.

* * * * *